United States Patent [19]

Hagen

[11] Patent Number: 5,065,268

[45] Date of Patent: Nov. 12, 1991

[54] LOAD BEAM HAVING AN ADDITIONAL BEND IN A HEAD-GIMBAL ASSEMBLY

[75] Inventor: Tracy M. Hagen, Minnetonka, Minn.

[73] Assignee: Seagate Technology, Inc., Scotts Valley, Calif.

[21] Appl. No.: 454,780

[22] Filed: Dec. 22, 1989

[51] Int. Cl.[5] .............................................. G11B 5/48
[52] U.S. Cl. .................................................... 360/104
[58] Field of Search ........................ 360/104, 105, 106

[56] References Cited

U.S. PATENT DOCUMENTS

| | | | |
|---|---|---|---|
| 3,786,457 | 1/1974 | Kahn | 340/174 |
| 3,931,641 | 1/1976 | Watrous | 360/104 |
| 4,167,765 | 9/1979 | Watrous | 360/103 |
| 4,189,759 | 2/1980 | Bauck et al. | 360/104 |
| 4,268,879 | 5/1981 | Watrous | 360/104 |
| 4,323,938 | 4/1982 | Thompson | 360/105 |
| 4,399,476 | 8/1983 | King | 360/104 |
| 4,408,238 | 10/1983 | Hearn | 360/104 |
| 4,443,824 | 4/1984 | Frater et al. | 360/104 |
| 4,456,936 | 6/1984 | Steen et al. | 360/104 |
| 4,473,855 | 9/1984 | Plotto et al. | 360/104 |
| 4,605,979 | 8/1986 | Inoue et al. | 360/105 |
| 4,620,251 | 10/1986 | Gitzendanner | 360/103 |
| 4,651,243 | 3/1987 | Daste et al. | 360/104 |
| 4,723,186 | 2/1988 | Nakajima et al. | 360/104 |
| 4,734,805 | 3/1988 | Yamada et al. | 360/104 |
| 4,843,502 | 6/1989 | Tagawa | 360/105 |
| 4,853,812 | 8/1989 | Daito et al. | 360/104 |
| 4,933,791 | 6/1990 | Cheng | 360/104 |
| 4,947,275 | 8/1990 | Hinlein | 360/104 |

Primary Examiner—John H. Wolff
Assistant Examiner—Jefferson Evans
Attorney, Agent, or Firm—Kinney & Lange

[57] ABSTRACT

A load beam couples a gimbal to a support arm in a head-gimbal assembly. A resilient section has a first end for attachment to the support arm and a second end. The resilient section also has a plurality of preformed bends between the first and second ends. A substantially rigid section has a first end coupled to the second end of the resilient section and a second end for attachment to the gimbal.

16 Claims, 14 Drawing Sheets

*Fig. 1*

(PRIOR ART)

*Fig. 2A*

(PRIOR ART)

*Fig. 2B*

(PRIOR ART)

SLOPE = $\int \frac{M}{EI} dx$ $0 < x < P \quad \frac{M}{EI} = \frac{F}{EI}(x-L)$ $P < x < L \quad \frac{M}{EI} = 0$ $0 < x < P \quad \text{SLOPE} = \int_0^P \frac{F}{EI}(x-L)dx = \frac{F}{EI}(\frac{1}{2}x^2 - Lx)$ $P < x < L \quad \text{SLOPE} = \frac{F}{EI}(\frac{1}{2}P^2 - Lp) = \frac{F}{EI}P(\frac{P}{2}-L)$ DEFLECTION = $\int$ SLOPE dx $0 < x < P \quad \text{DEFLECTION} = \int \frac{F}{EI}(\frac{1}{2}x^2 - Lx)dx = \frac{F}{EI}(\frac{1}{6}x^3 - \frac{1}{2}Lx^2)$ $P < x < L \quad \text{DEFLECTION} = \frac{F}{EI}(\frac{1}{6}P^3 - \frac{1}{2}Lp^2) + \frac{F}{EI}(\frac{P}{2}-L)(x-P)$

*Fig. 4C*

DEFLECTION AT x = L $$\frac{F}{EI}\left[\frac{1}{6}p^3 - \frac{1}{2}Lp^2 + p(\frac{p}{2}-L)(L-p)\right]$$

$$= \frac{F}{EI}(\frac{1}{6}p^3 - \frac{1}{2}Lp^2 + \frac{1}{2}Lp^2 - \frac{1}{2}p^3 - pL^2 + Lp^2)$$

$$= \frac{F}{EI}(-\frac{1}{3}p^3 + Lp^2 - L^2p)$$

IDEAL FREE STATE (ZERO ANGLE LOAD BEAM WHEN LOADED)

$$0 < x < p \quad y(x) = \frac{F}{EI}(\frac{1}{2}Lx^2 - \frac{1}{6}x^3)$$

$$y(x=L) = \frac{F}{EI}(\frac{1}{3}p^3 - Lp^2 + L^2p)$$

ACTUAL FREE STATE DUE TO MANDREL FORMING $$0 < x < A \quad y(x) = 0$$

$$A < x < L \quad y(x) = \frac{F}{EI}(\frac{1}{3}p^3 - Lp^2 + L^2p)(\frac{x-A}{L-A})$$

DEFINE OPTIMUM BEND POINT BY $$\int_0^p (y(x) \text{ FOR IDEAL FREE STATE}) \, dx = \int_0^p (y(x) \text{ FOR ACTUAL FREE STATE}) \, dx$$

$$\int_0^p \frac{F}{EI}(\frac{1}{2}Lx^2 - \frac{1}{6}x^3) \, dx = \int_A^p \frac{F}{EI}(\frac{1}{3}p^3 - Lp^2 + L^2p)(\frac{x-A}{L-A}) \, dx$$

$$\int_0^p (\frac{1}{2}Lx^2 - \frac{1}{6}x^3) \, dx = \frac{\frac{1}{3}p^3 - Lp^2 + L^2p}{L-A} \int_A^p (x-A) \, dx$$

*Fig. 4D*

$$\left(\frac{1}{6}Lx - \frac{1}{24}x^4\right)\Big|_0^p = \frac{\frac{1}{3}p^3 - Lp^2 + L^2p}{L-A}\left(\frac{1}{2}x^2 - Ax\right)\Big|_A^p$$

$$\frac{1}{6}Lp^3 - \frac{1}{24}p^4 = \frac{\frac{1}{3}p^3 - Lp^2 + L^2p}{L-A}\left(\frac{1}{2}p^2 - Ap - \frac{1}{2}A^2 + A^2\right)$$

$$\left(\frac{1}{6}Lp^3 - \frac{1}{24}p^4\right)(L-A) = \left(\frac{1}{3}p^3 - Lp^2 + L^2p\right)\left(\frac{1}{2}p^2 - Ap + \frac{1}{2}A^2\right)$$

$$\frac{1}{2}\left(\frac{1}{3}p^3 - Lp^2 + L^2p\right)A^2 + \left(\frac{1}{6}Lp^3 - \frac{1}{24}p^4 - \frac{1}{3}p^4 + Lp^3 - L^2p^2\right)A$$

$$+ \left(\frac{1}{3}p^3 - Lp^2 + L^2p\right)\frac{1}{2}p^2 - \left(\frac{1}{6}Lp^3 - \frac{1}{24}p^4\right)L = 0$$

$$\frac{1}{2}\left(\frac{1}{3}p^2 - Lp + L^2\right)A^2 + \left(\frac{7}{6}Lp^2 - \frac{3}{8}p^3 - L^2p\right)A + \frac{1}{6}p^4 - \frac{11}{24}Lp^3 + \frac{1}{3}L^2p^2 = 0$$

$$\boxed{(4p^2 - 12Lp + 12L^2)A^2 + (28Lp^2 - 9p^3 - 24L^2p)A + (4p^4 - 11Lp^3 + 8L^2p^2) = 0}$$

EQ I $$aA^2 + bA + C = 0$$

$$A = \frac{-b - \sqrt{b^2 - 4ac}}{2a}$$

FOR $a = 4p^2 - 12Lp + 12L^2$; $b = 28Lp^2 - 9p^3 - 24L^2p$; $C = 4p^4 - 11Lp^3 + 8L^2p$

TWO BEND FREE STATE

AT $x=p$  $y(x)=\frac{F}{EI}(\frac{1}{2}Lp^2-\frac{1}{6}p^3)$ $y'(p)=\frac{F}{EI}(Lp-\frac{1}{2}p^2)$ $C<x<L$  $y(x)=\frac{F}{EI}(Lp-\frac{1}{2}p^2)(x-p)+\frac{F}{EI}(\frac{1}{2}Lp^2-\frac{1}{6}p^3)$ $$=\frac{F}{EI}\left[(Lp-\frac{1}{2}p^2)x-Lp^2+\frac{1}{2}p^3+\frac{1}{2}Lp^2-\frac{1}{6}p^3\right]$$

$$=\frac{F}{EI}\left[(Lp-\frac{1}{2}p^2)x+\frac{1}{3}p^3-\frac{1}{2}Lp^2\right]$$

AT $x=C$  $y(c)=\frac{F}{EI}\left[(Lp-\frac{1}{2}p^2)C+\frac{1}{3}p^3-\frac{1}{2}Lp^2\right]$ $B<x<C$  $y(x)=\frac{F}{EI}\left[(Lp-\frac{1}{2}p^2)C+\frac{1}{3}p^3-\frac{1}{2}Lp^2\right](\frac{x-B}{C-B})$ $$\int_0^p (\text{IDEAL FREE STATE})dx = \int_0^p (\text{TWO BEND FREE STATE})dx$$

$$\int_0^p \frac{F}{EI}(\frac{1}{2}Lx^2-\frac{1}{6}x^3)dx = \int_B^C \frac{F}{EI}\left[(Lp-\frac{1}{2}p^2)C+\frac{1}{3}p^3-\frac{1}{2}Lp^2\right](\frac{x-B}{C-B})dx$$

$$+ \int_C^p \frac{F}{EI}\left[(Lp-\frac{1}{2}p^2)x+\frac{1}{3}p^3-\frac{1}{2}Lp^2\right]dx$$

*Fig. 8B*

$$\left(\frac{1}{6}Lx^3 - \frac{1}{24}x^4\right)\Big|_0^p = \frac{(Lp-\frac{1}{2}p^2)C + \frac{1}{3}p^3 - \frac{1}{2}Lp^2}{C-B}\left(\frac{1}{2}x^2 - Bx\right)\Big|_B^C$$

$$+ \left[\frac{1}{2}(Lp-\frac{1}{2}p^2)x^2 + (\frac{1}{3}p^3 - \frac{1}{2}Lp^2)x\right]\Big|_C^p$$

$$\frac{1}{6}Lp^3 - \frac{1}{24}p^4 = \frac{(Lp-\frac{1}{2}p^2)C + \frac{1}{3}p^3 - \frac{1}{2}Lp^2}{C-B}\left(\frac{1}{2}C^2 - BC - \frac{1}{2}B^2 + B^2\right)$$

$$+ \left[\frac{1}{2}(Lp-\frac{1}{2}p^2)p^2 + (\frac{1}{3}p^3 - \frac{1}{2}Lp^2)p\right]$$

$$- \left[\frac{1}{2}(Lp-\frac{1}{2}p^2)C^2 + (\frac{1}{3}p^3 - \frac{1}{2}Lp^2)C\right]$$

$$\frac{1}{6}Lp^3 - \frac{1}{24}p^4 = \frac{(Lp-\frac{1}{2}p^2)C + \frac{1}{3}p^3 - \frac{1}{2}Lp^2}{C-B}\cdot \frac{1}{2}(C-B)^2$$

$$+ \left[\frac{1}{2}Lp^3 - \frac{1}{4}p^4 + \frac{1}{3}p^4 - \frac{1}{2}Lp^3\right]$$

$$- \left[\frac{1}{2}(Lp-\frac{1}{2}p^2)C^2 + (\frac{1}{3}p^3 - \frac{1}{2}Lp^2)C\right]$$

$$\frac{1}{6}Lp^3 - \frac{1}{24}p^4 = \frac{1}{2}\left[(Lp-\frac{1}{2}p^2)C^2 + (\frac{1}{3}p^3 - \frac{1}{2}Lp^2)C - (Lp-\frac{1}{2}p^2)BC\right.$$

$$\left. - (\frac{1}{3}p^3 - \frac{1}{2}Lp^2)B\right] + \frac{1}{12}p^4 - \frac{1}{2}(Lp-\frac{1}{2}p^2)C^2 - (\frac{1}{3}p^3 - \frac{1}{2}Lp^2)C$$

*Fig. 8C*

$$\frac{1}{6}Lp^3 - \frac{1}{24}p^4 = \frac{1}{2}(Lp - \frac{1}{2}p^2)C^2 + \frac{1}{2}(\frac{1}{3}p^3 - \frac{1}{2}Lp^2)C - \frac{1}{2}(Lp - \frac{1}{2}p^2)BC$$

$$-\frac{1}{2}(\frac{1}{3}p^3 - \frac{1}{2}Lp^2)B + \frac{1}{12}p^4 - \frac{1}{2}(Lp - \frac{1}{2}p^2)C^2$$

$$-(\frac{1}{3}p^3 - \frac{1}{2}Lp^2)C$$

$$\frac{1}{6}Lp^3 - \frac{1}{24}p^4 + \frac{1}{2}(Lp - \frac{1}{2}p^2)BC + \frac{1}{2}(\frac{1}{3}p^3 - \frac{1}{2}Lp^2)B - \frac{1}{12}p^4 + \frac{1}{2}(\frac{1}{3}p^3 - \frac{1}{2}Lp^2)C = 0$$

$$\frac{1}{3}Lp^3 - \frac{1}{12}p^4 + (Lp - \frac{1}{2}p^2)BC + (\frac{1}{3}p^3 - \frac{1}{2}Lp^2)B + (\frac{1}{3}p^3 - \frac{1}{2}Lp^2)C = 0$$

$$\boxed{(Lp - \frac{1}{2}p^2)BC + (\frac{1}{3}p^3 - \frac{1}{2}Lp^2)(B+C) + \frac{1}{3}Lp^3 - \frac{1}{4}p^4 = 0} \quad \text{EQ 2}$$

FOR EQUAL DEPTH AT B AND C $$\frac{F}{EI}(\frac{1}{2}LB^2 - \frac{1}{6}B^3) = \frac{F}{EI}(\frac{1}{2}LC^2 - \frac{1}{6}C^3) - \frac{F}{EI}\left[(Lp - \frac{1}{2}p^2)C + \frac{1}{3}p^3 - \frac{1}{2}Lp^2\right]$$

$$\boxed{\frac{1}{2}LB^2 - \frac{1}{6}B^3 = \frac{1}{2}LC^2 - \frac{1}{6}C^3 - (Lp - \frac{1}{2}p^2)C - \frac{1}{3}p^3 + \frac{1}{2}Lp^3} \quad \text{EQ 3}$$

LOAD BEAM HAVING AN ADDITIONAL BEND IN A HEAD-GIMBAL ASSEMBLY

BACKGROUND OF THE INVENTION

1. Field of the Invention

This invention relates to a head-gimbal assembly in a hard disk file. More particularly, the present invention relates to a load beam in the head-gimbal assembly.

2. Description of the Prior Art

A head-gimbal assembly (HGA) used in a hard disk file consists essentially of three components. The first component is a slider which features a selfacting hydrodynamic air bearing and an electromagnetic transducer used for recording and retrieving information from a spinning magnetic disk.

The second component is a gimbal which is attached to the slider. The gimbal is resilient in the slider's pitch and roll directions to allow the slider to follow the topography of the disk which it is flying over. Also, the gimbal is rigid in the yaw and in-plane directions for maintaining precise inplane slider positioning.

The third component is a load beam which is attached to the gimbal and to a support arm. The load beam is resilient in the vertical direction. This resiliency also allows the slider to follow the topography of the disk. As with the gimbal, the load beam is rigid in the in-plane directions.

The load beam also acts as a spring supplying a downward force that counteracts the hydrodynamic lifting force developed by the slider's air bearing. In order to produce this counteracting force, the load beam is provided with a single bend so that it urges the gimbal and slider towards the disk. However, ideal operation of the HGA in the loaded state (i.e., when the rotating disk is up to speed and the slider is flying above the disk) requires the load beam to have great in-plane stiffness and rigidity. To achieve ideal in-plane stiffness and rigidity, the load beam should be completely flat when it is in the loaded-state. If the load beam has excessive contours and curves or waviness when operating in the loaded state, it has poor in-plane rigidity and is a frequent source of troublesome vibrations and resonances.

SUMMARY OF THE INVENTION

The present invention improves load beam flatness in a loaded state. The present invention is a load beam for coupling a gimbal to a support arm in a headgimbal assembly. The load beam includes a resilient section and a substantially rigid section. The resilient section has a first end for attachment to the support arm and a second end for attachment to the substantially rigid section. The resilient section has a plurality of preformed bends between its first and second ends. The substantially rigid section has a first end coupled to the second end of the resilient section. The substantially rigid section also has a second end for attachment to the gimbal.

DETAILED DESCRIPTION OF THE PREFERRED EMBODIMENTS

Figure 1:
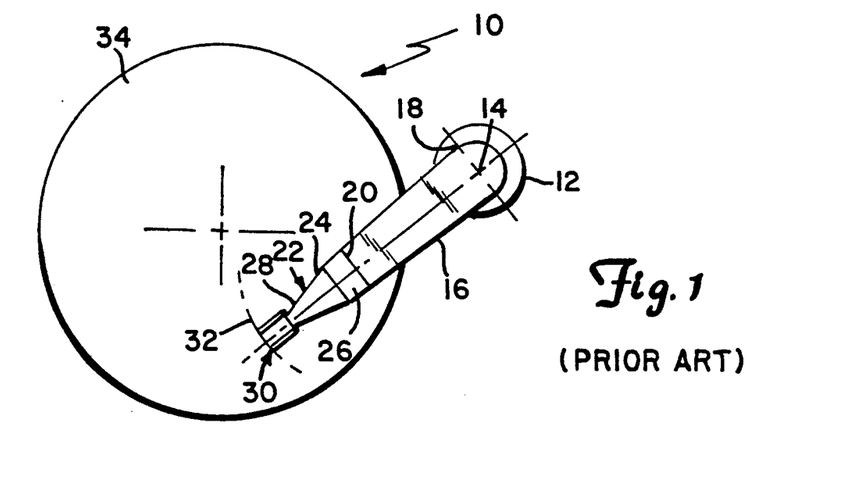
FIG. 1 is a top view of a magnetic disk in a hard disk file with an associated support arm and headgimbal assembly.

FIG. 1 shows a conventional pivoting positioner system 10 for a hard disk file. A rotary actuator 12 rotates about axis of rotation 14 A head supporting arm 16 has a first end 18 and a second end 20. First end 18 is rigidly secured to actuator 12 for rotation about axis 14. Second end 20 of support arm 16 is rigidly secured to head-gimbal assembly 22.

Head-gimbal assembly 22 includes load beam 24, which has a first end 26 rigidly attached to second end 20 of support arm 16 and has a second end 28 attached to slider 30. As actuator 12 rotates about axis 14, slider 30 moves along arc 32. Hence, rotation of actuator 12 about axis 14 radially repositions slider 30 with respect to magnetic disk 34.

Figure 2A:
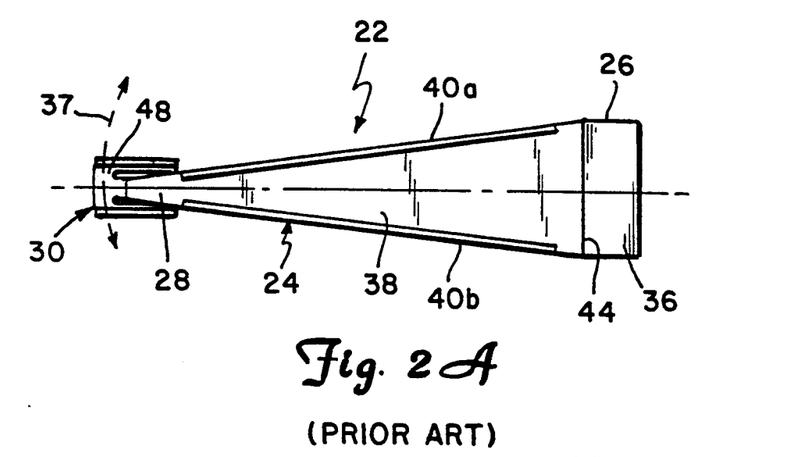
FIG. 2A is an enlarged top view of a head-gimbal assembly of the prior art.

FIG. 2A is an enlarged top view of head-gimbal assembly 22 of the prior art. Head-gimbal assembly 22 is generally comprised of load beam 24 which has thin, resilient section 36 integrally formed with rigid, tapered section 38. Rigid section 38 has flanges 40a and 40b along its edges, and is fixedly attached at its second end 28 to gimbal spring 48 which is a resilient spring member. Gimbal spring 48, in turn, is secured (typically glued) to slider 30.

Figure 2B:
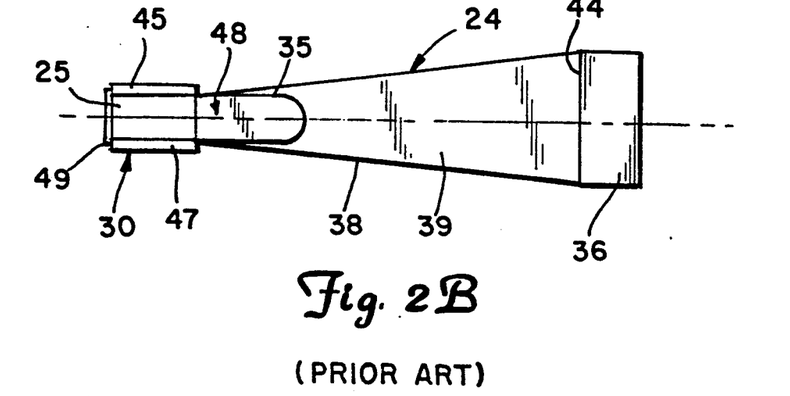
FIG. 2B is an enlarged bottom view of the headgimbal assembly of the prior art.

FIG. 2B shows under side 39 of rigid section 38 and under side 25 of slider 30. A hydrodynamic air bearing, in the form of skis 45 and 47, is formed on the under side of slider 30. A magnetic transducer for recording and retrieving information from disk 34 is secured to trailing edge 49 of ski 47. Also, gimbal spring 48 has plate portion 35 which is typically welded to under side 39 of rigid section 38.

Figure 3A:
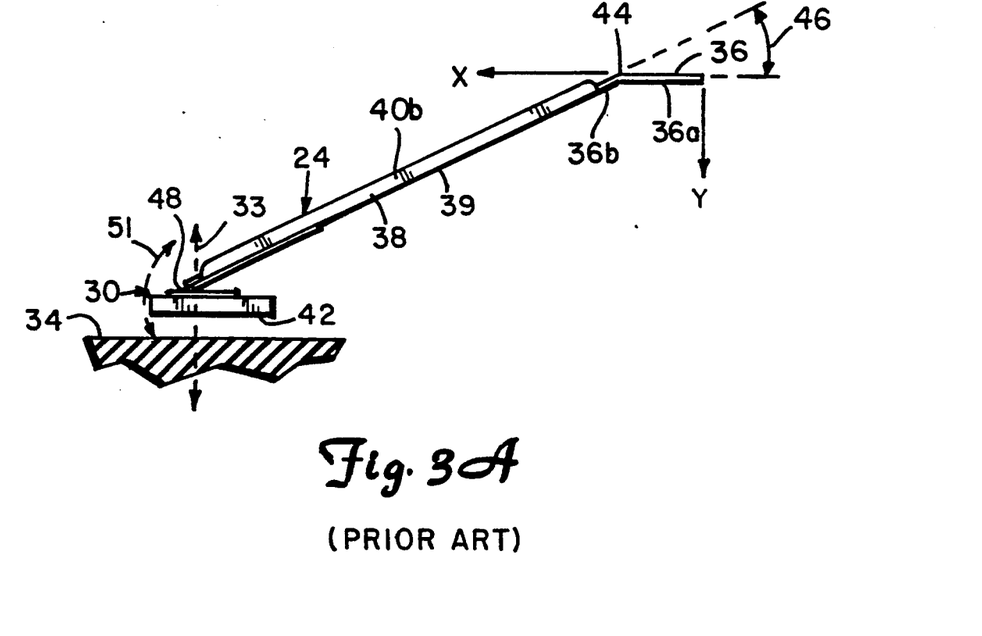
FIG. 3A is a side view of the prior art headgimbal assemoly, shown in FIG. 2.

FIG. 3A shows a side view of head-gimbal assembly 2. Resilient section 36 of load beam 24 is bent along bend line 44. The bend along bend line 44 is typically made by bending resilient section 36 around a mandrel.

When load beam 24 is in the free state (an unconstrained state), resilient section 36 is bent at an angle 46 which is approximately 20°.

Figure 3B:
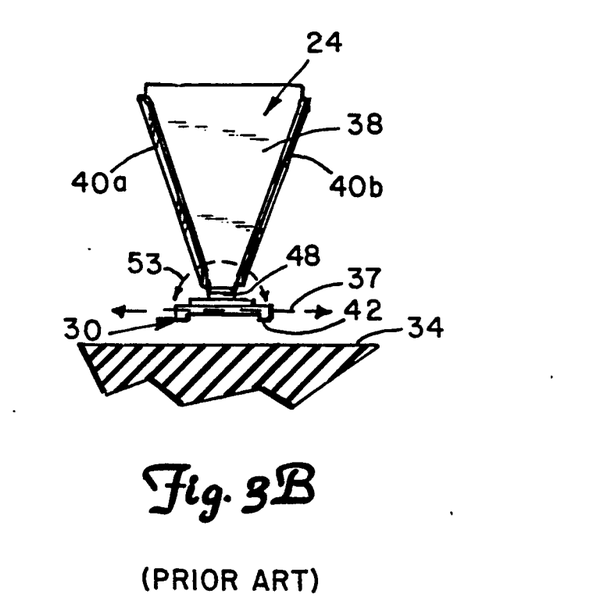
FIG. 3B is a front view of the prior art headgimbal assembly, shown in FIGS. 2 and 3.

For slider 30 to accurately follow the topography on magnetic disk 34, it is very important for headgimbal assembly 22 to provide connections between support arm 16 and slider 30 which are resilient in the pitch and roll angles and in the vertical direction of slider 30. The pitch angle is shown by arrow 51 in FIG. 3A; the roll angle is shown by arrow 3 in FIG. 3B and the vertical direction is shown by arrow 33 in FIG. 3A. This resiliency allows slider 0 to follow the topography of magnetic disk 34.

Gimbal spring 48, being a resilient spring member, provides a connection between slider 30 and rigid section 38 of load beam 24 which is resilient in the pitch and roll directions of slider 30. Also, the bend along bend line 44 in resilient section 36 provides a connection between support arm 16 and slider 30 which is resilient in the vertical direction of slider 30. Therefore, the required resilient connections are provided.

However, it is equally important that head-gimbal assembly 22 provide slider 30 with in-plane (shown by arrow 37 in FIGS. 2A and 3B) rigidity so that the positioning system can accurately position transducer 30 radially with respect to magnetic disk 34. Hence, flanges 40a and 40b are provided on rigid section 38 of load beam 24. These flanges enhance the in-plane rigidity of load beam 24.

When magnetic disk 34 is rotating at full speed, the air bearing formed by skis 45 and 47 on slider 30 provide a hydrodynamic force which urges slider 30 away from magnetic disk 34. When disk 34 is up to speed, load beam 24 is said to be in the loaded state. The bend alonq bend line 44 in resilient seotion 36 provides a counteractive force which counteracts the hydrodynamic force provided by the air bearing. In order to achieve optimal rigidity, when load beam 24 is in the loaded state, the bend along bend line 44 should ideally be completely taken out. In other words, the entire length of resilient section 36 would form an angle of 180° with respect to rigid section 38.

Realistically this is very difficult to achieve, yet load beam 24 should be as flat as possible for optimum in-plane stiffness and rigidity. When load beam 24 is in a loaded state, any deviation from perfect flatness, or any contours or curves which arise in resilient section 36 as a result of load beam 24 moving to the loaded state decrease the in-plane rigidity and stiffness of load beam 24. These contours, curves or deviations from flatness are frequent sources of troublesome vibrations and resonances in load beam 24.

Figure 4A:
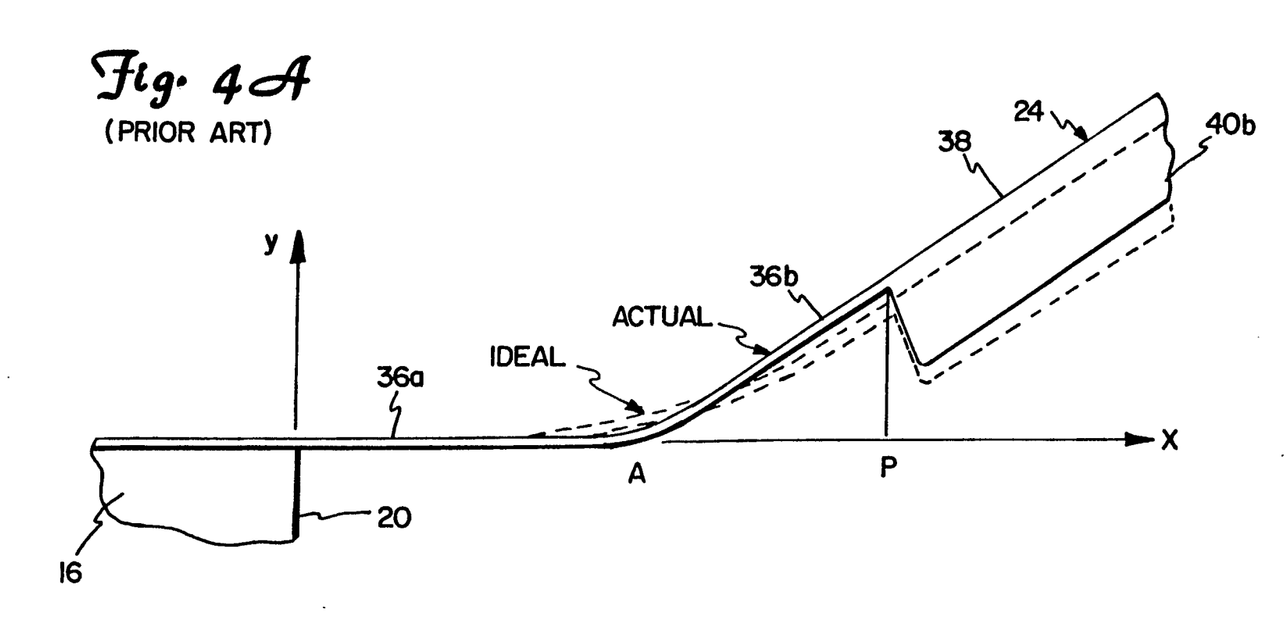
FIG. 4A is a graph of the bend in a head-gimbal assembly of the prior art, in the free state, as compared to, an ideal contour.

In order to achieve perfect flatness in the loaded state, the shape of resilient section 36 in the free state should be that of a third order polynomial. This is because the deflection of a cantilever beam is proportional to the third power of its length. FIG. 4A shows the resilient section 36 of the prior art as compared with an ideal curve. The X and Y axes of FIG. 4A are also shown in FIG. 3A to clarify the orientation of load beam 24 and resilient section 36 in FIG. 4A. The actual shape of resilient section 36 is shown by a solid line and the ideal curve is shown by a dashed line. FIG. 4A shows that resilient section 36 of the prior art in the free state has two straight portions 36a and 36b joined by a curve or bend at point A. The bend at point A corresponds to the bend along bend line 44 in FIGS. 2A, 2B and 3A.

Figure 5:
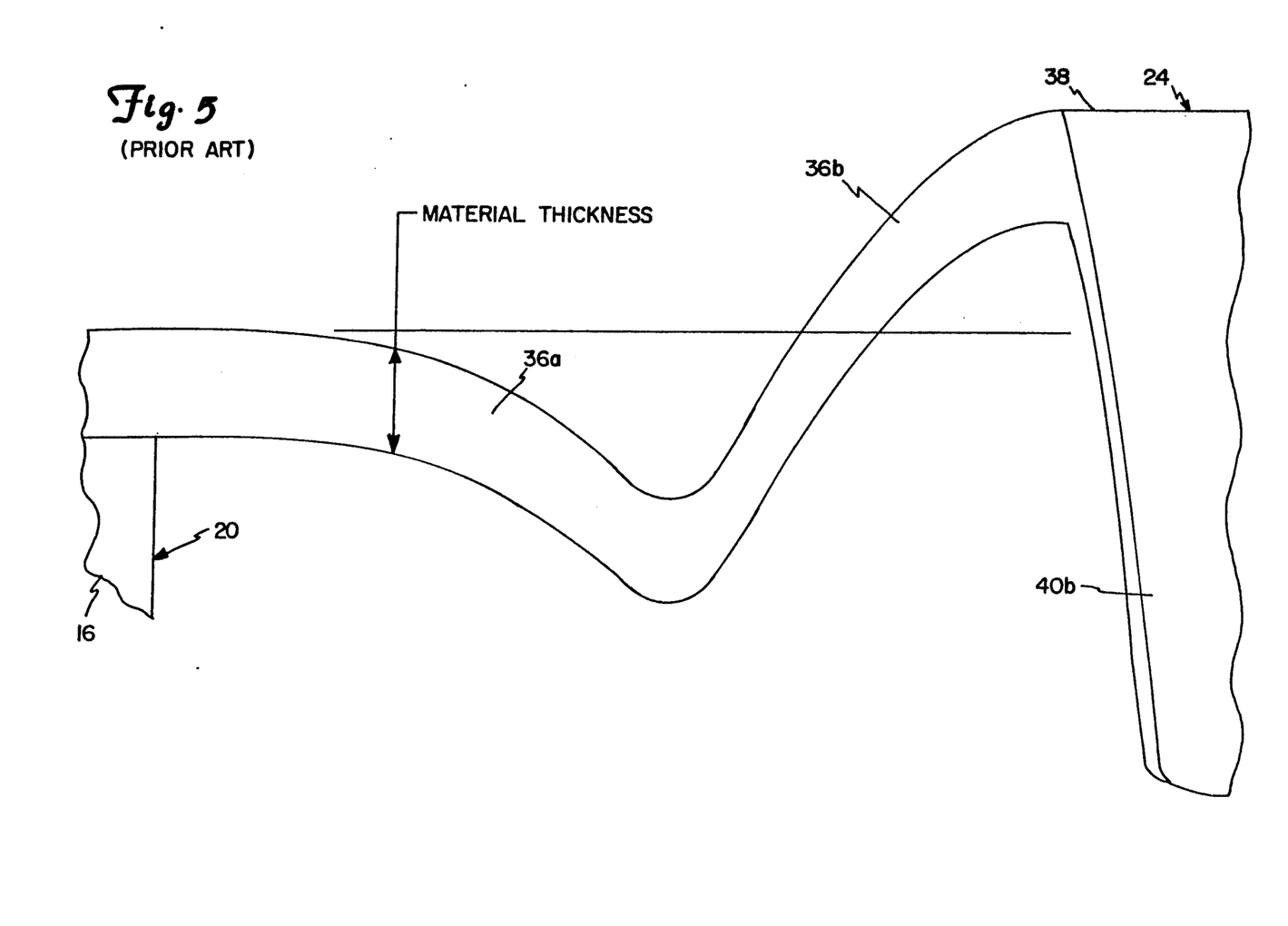
FIG. 5 is an enlarged side view of the bend in a load beam of the prior art in the loaded state.

FIG. 5 shows an enlarged side view of resilient section 36 in the loaded state. Since resilient section 36 has only a single bend, part of resilient section 36 is below the ideal flat line and part of resilient section 36 is above the line.

In the loaded state, equal portions of section 36 would optimally be above and below the ideal flat line to achieve maximum rigidity and stiffness. For this to be true, the two straight portions 36a and 36b of section 36 should intersect at an optimum point A which is given by:

$$(4p^2-12Lp+12L^2)A^2+(28Lp^2-9p^3-24L^2p)A+4p^4-11Lp^3+8L^2p^2=0 \quad \text{Eq. 1}$$

where p = the length of resilient section 36 and
L = the length of resilient section 36 plus rigid section 38.

Figure 4B:
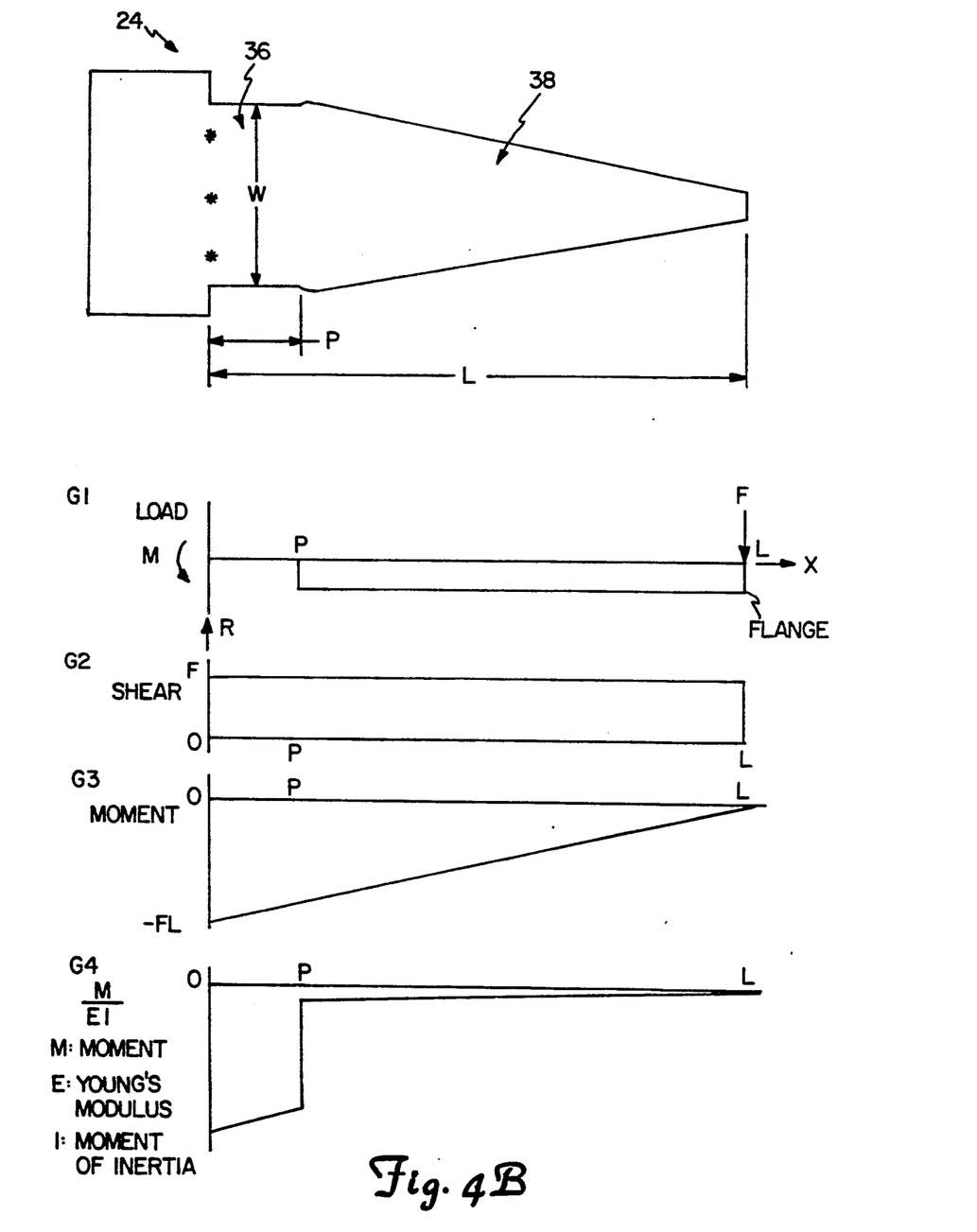
FIG. 4B shows diagrams of load, shear, moment and M/EI along length, L.
Figure 4C:
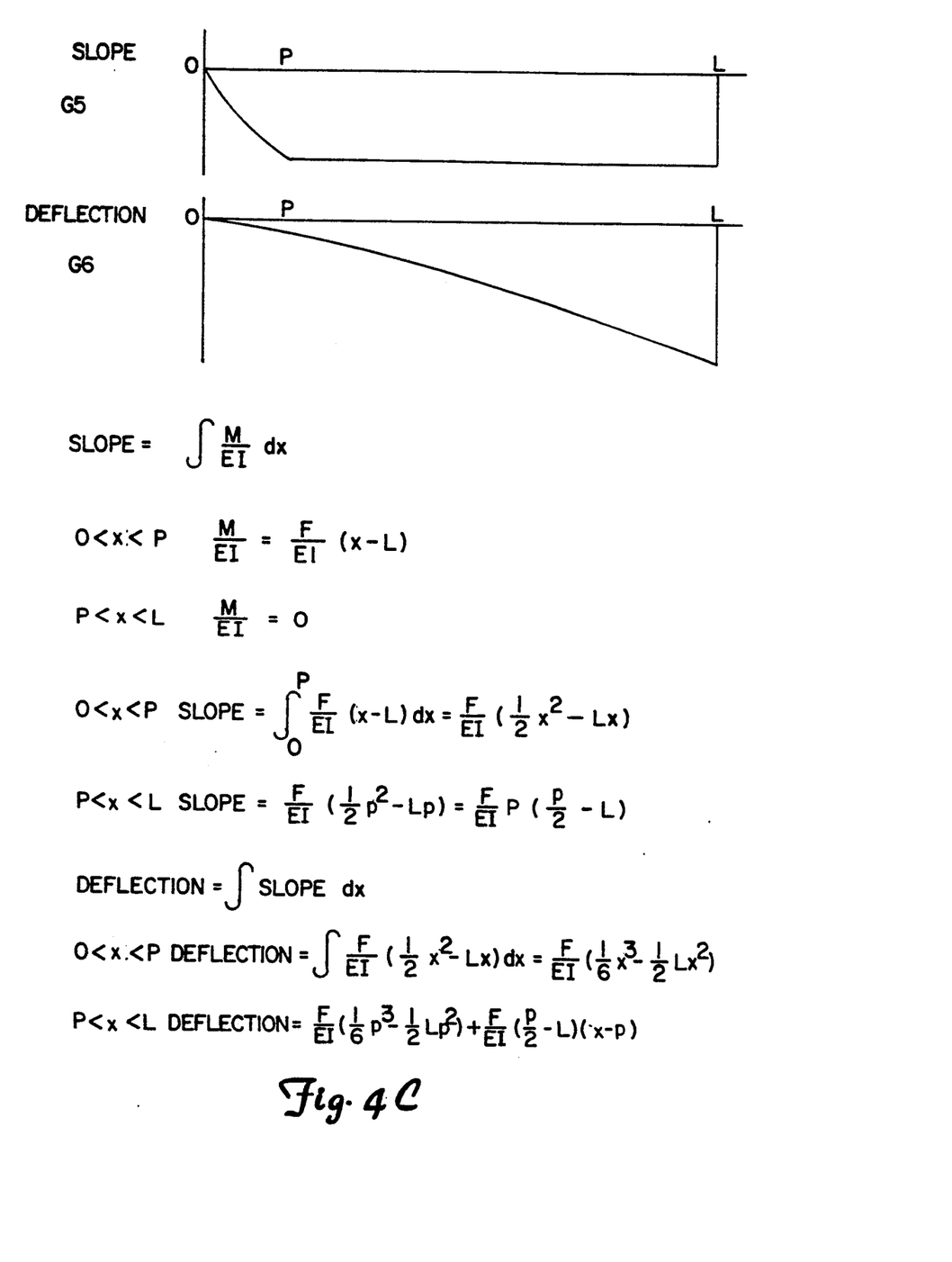
FIG. 4C shows diagrams of slope and deflection along length L as well as a partial derivation of a mathematical model representing the ideal and actual contours shown in FIG. 4A.
Figure 4D:
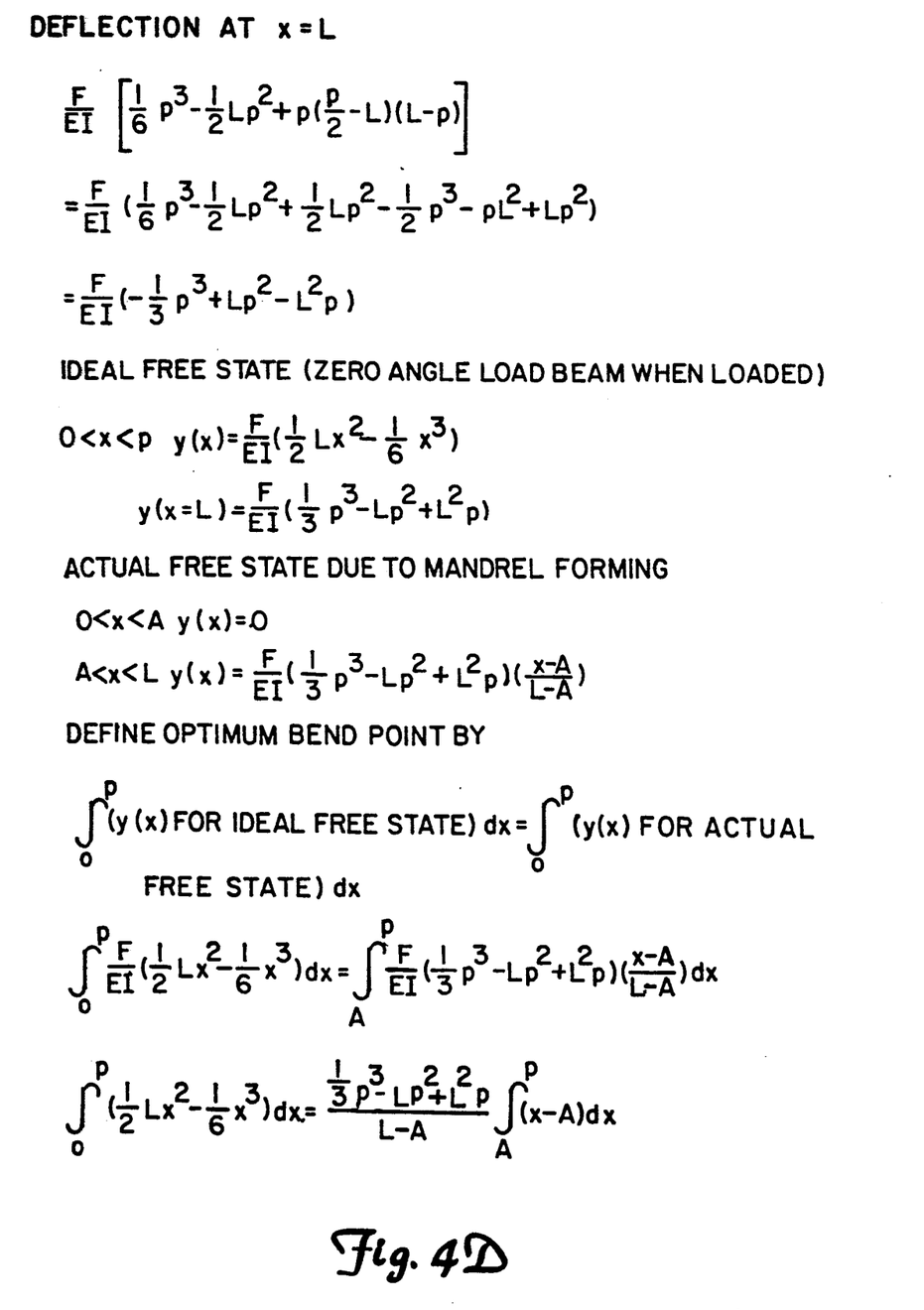
FIGS. 4D and 4E complete the derivation of the mathematical model representing the ideal contour and the actual contour shown in FIG. 4A and begun in FIG. 4C.
Figure 4E:
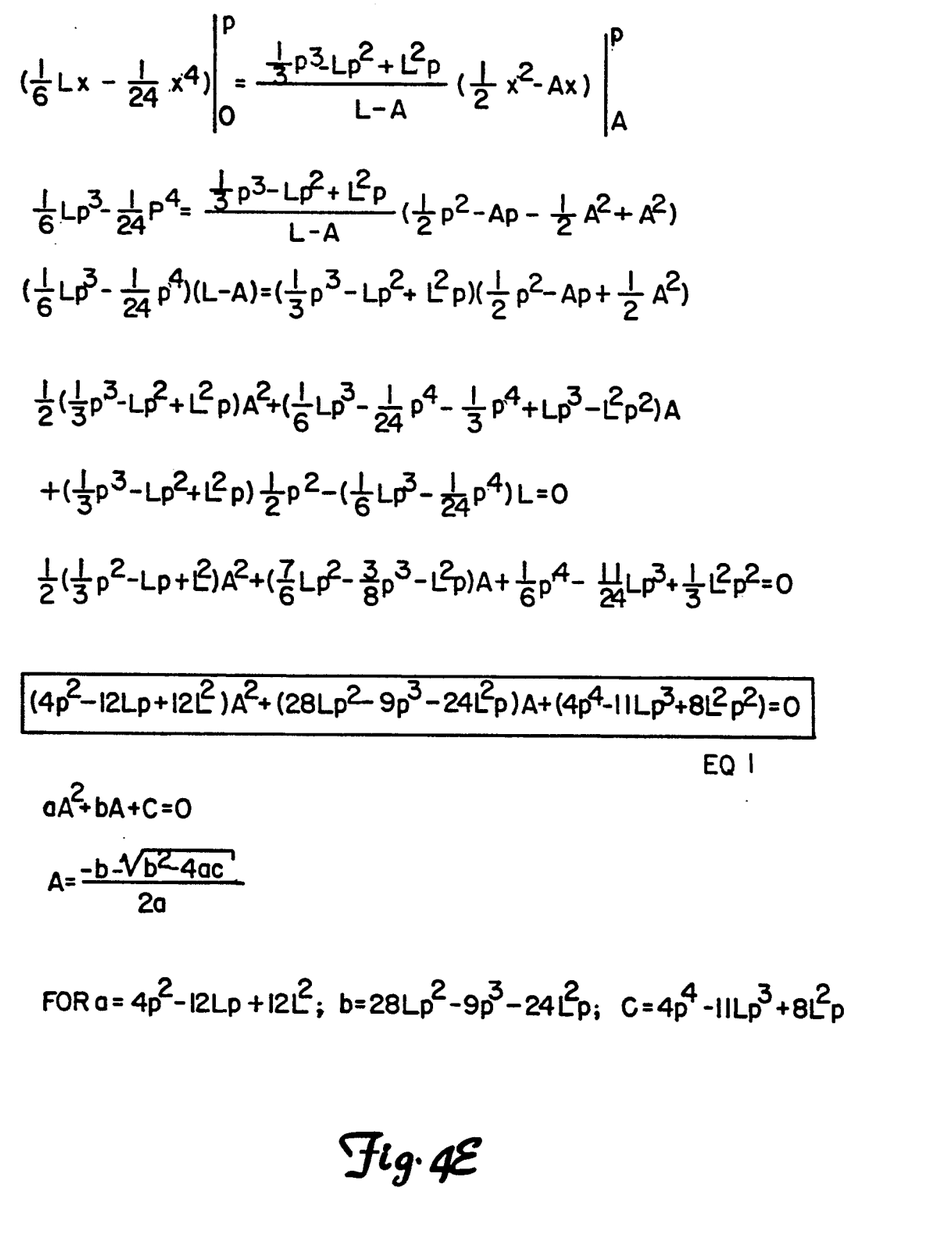

The optimum bend point A is solved for in FIGS. 4B–4E. FIG. 4B shows load beam 24 as well as diagrams of the Load on load beam 24 (free body diagram G1), the Shear (diagram G2), the Moment (diagram G3) and a graph of the Moment divided by the product of Young's Modulus and the Moment of Inertia (diagram G4) along the length L of resilient section 36 plus rigid section 38. FIG. 4C shows a graph of the Slope and Deflection (diagrams G5 and G6) over length L, as well as the beginning of the derivation of equation 1 and optimum bend point A. FIGS. 4D and 4E complete the derivation.

FIG. 5 shows that resilient section 36 dips sharply downward to point A and then rises abruptly upward. The depth of the dip for a given point A is largely controlled by the diameter of the mandrel used to make the bend at point A. Small diameter mandrels produce much deeper, unwanted depressions in the rectangular section but generally result in a beneficial reduction of curvature across the surface of section 36. Larger diameter mandrels have less depression (and hence less deviation from the ideal flat line) but have more curvature across the surface of section 36. Further, the use of large diameter mandrels strains the material used to form section 36 to a point just above its yield strength. Thus, changes in the yield strength between material lots forces the manufacturer to continually adjust the bending process. Regardless of whether large or small diameter mandrels are used, the curvature of the surface of section 36 and the deviation from perfect flatness in the loaded state lead to poor in-plane rigidity. Hence, resilient section 36 is a major source of troublesome vibrations and resonances in load beam 24.

Figure 6:
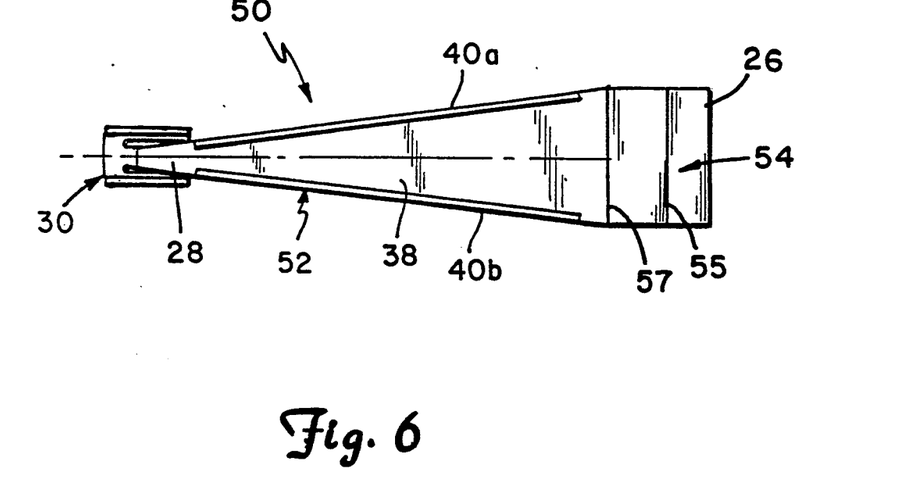
FIG. 6 is a top view of the head-gimbal assembly of the present invention.
Figure 7:
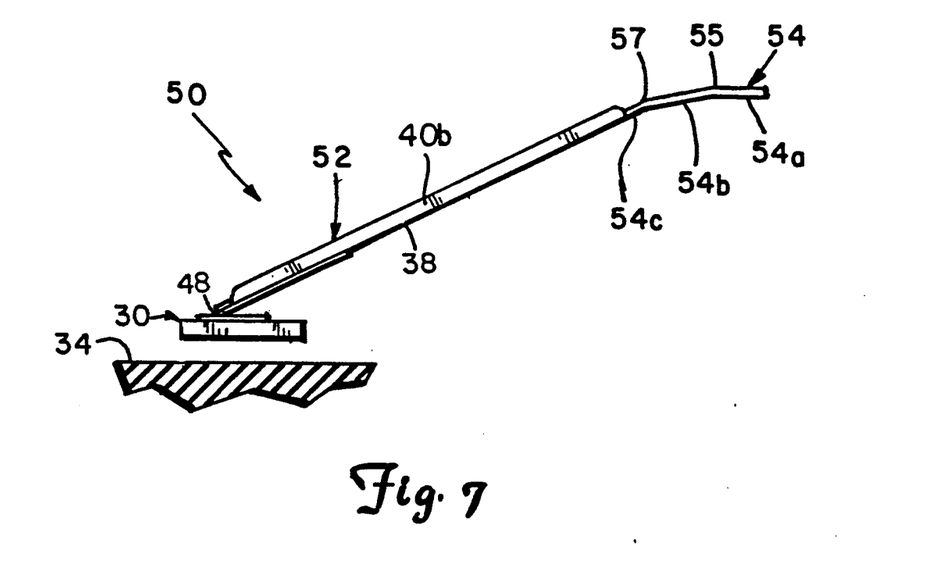
FIG. 7 is a side view of the head-gimbal assembly shown in FIG. 6.

FIG. 6 shows head-gimbal assembly 50 of the present invention. Head-gimbal assembly 50 has some features which are similar to head-gimbal assembly 22 of the prior art and which are labeled the same.

However, head-gimbal assembly 50 is provided with a new load beam 52. Load beam 52, in turn, is provided with a new resilient section 54. Resilient section 54 is provided with two preformed bends along bend lines and 57. Bends 55 and 57 divide section 54 into straight sections 54a, 54b and 54c.

Figure 8A:
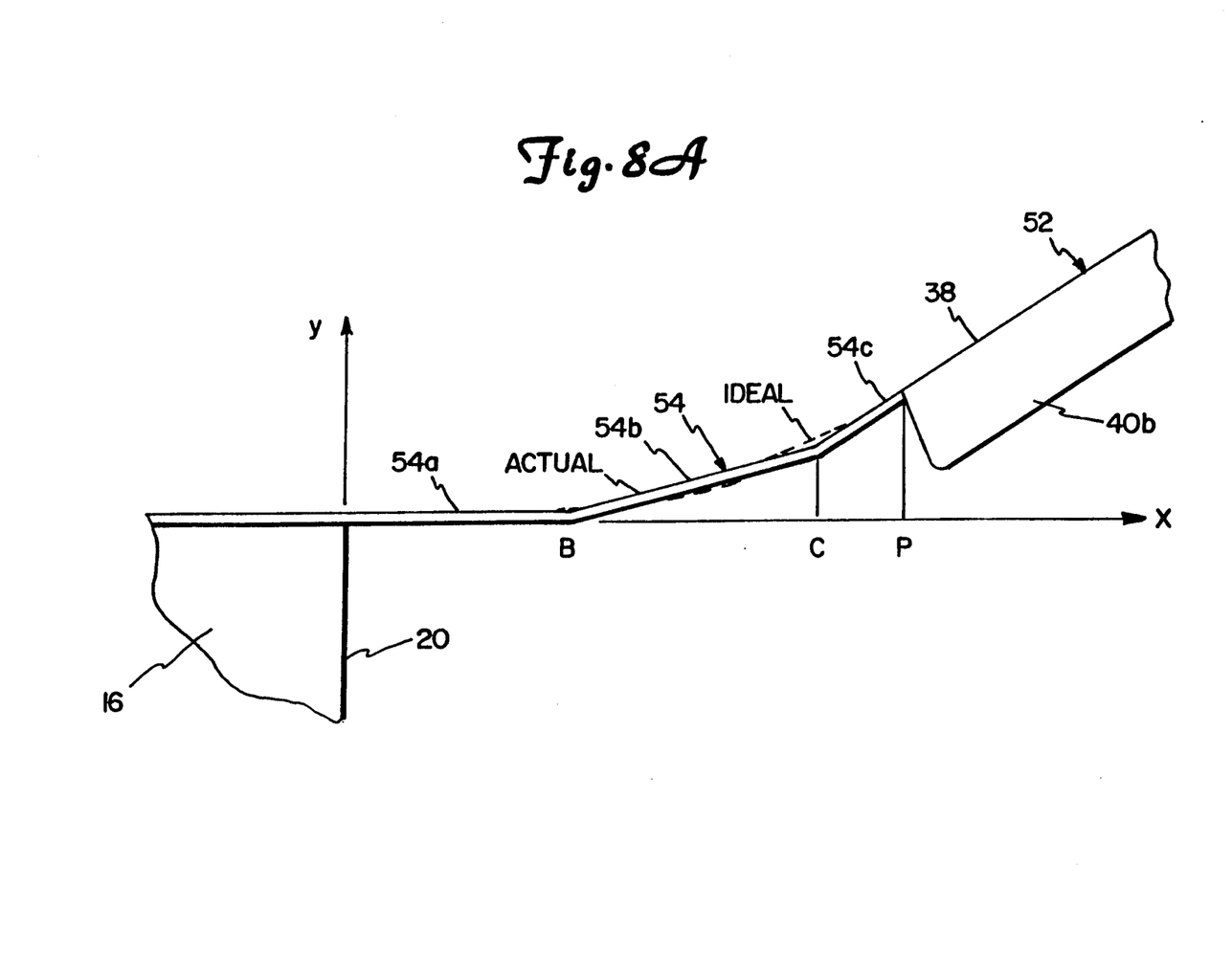
FIG. 8A is a graph showing the relationship between the actual contour of the load beam of the present invention in the free state and the ideal contour.

FIG. 8A shows that the shape of section 54 approximates the ideal curve in the free state much more closely than section 36 of the prior art. FIG. A also shows that bends 55 and 57 in section 54 are made at points B and C.

Two criteria are used in determining points B and C. First, the amount of material used in forming section 54 which is above the ideal flat line must be equal to the amount of material below the ideal flat line for optimum in-plane rigidity. This results in the following relationship between points B and C.

$$(Lp - \tfrac{1}{2}p^2)BC + (\tfrac{1}{3}p^3 - \tfrac{1}{2}Lp^2)(B+C) + \tfrac{1}{4}Lp^3 - \tfrac{1}{5}p^4 = 0 \qquad \text{Eq. 2}$$

where p = the length of resilient section 54 and L = the length of resilient section 54 plus rigid section 38.

Figure 8B:
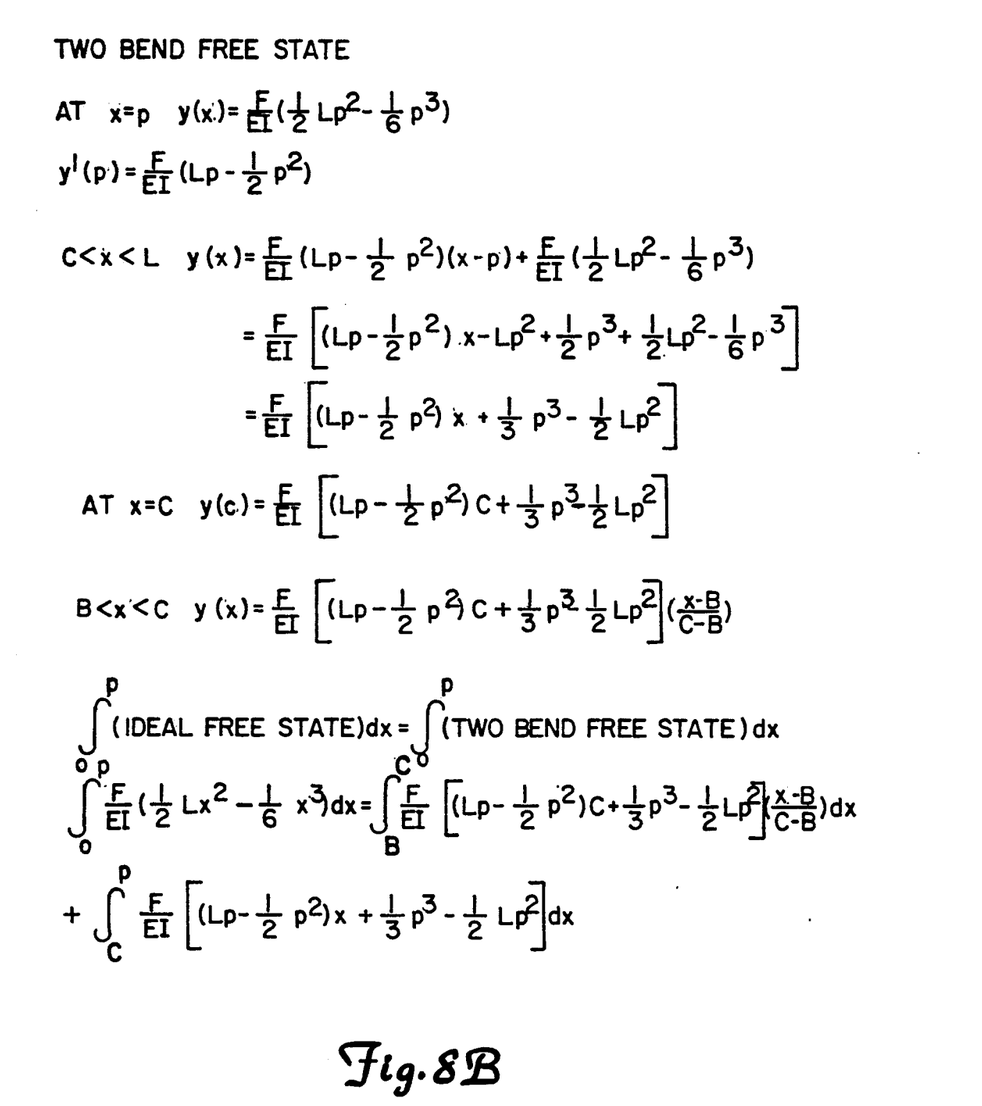
FIGS. 8B–8D show a mathematical model representing the actual contour shown in FIG. 8A.
Figure 8C:
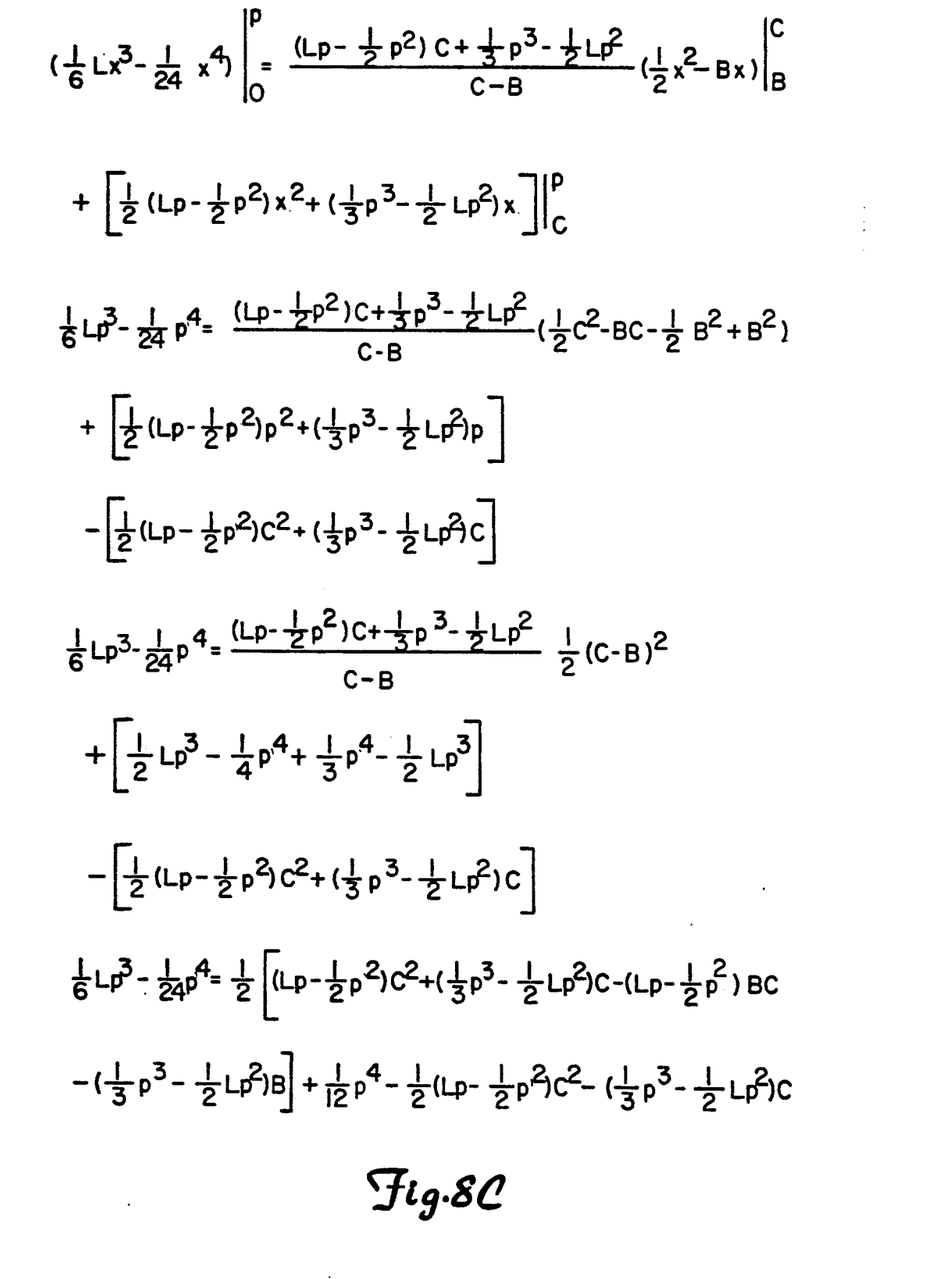
Figure 8D:
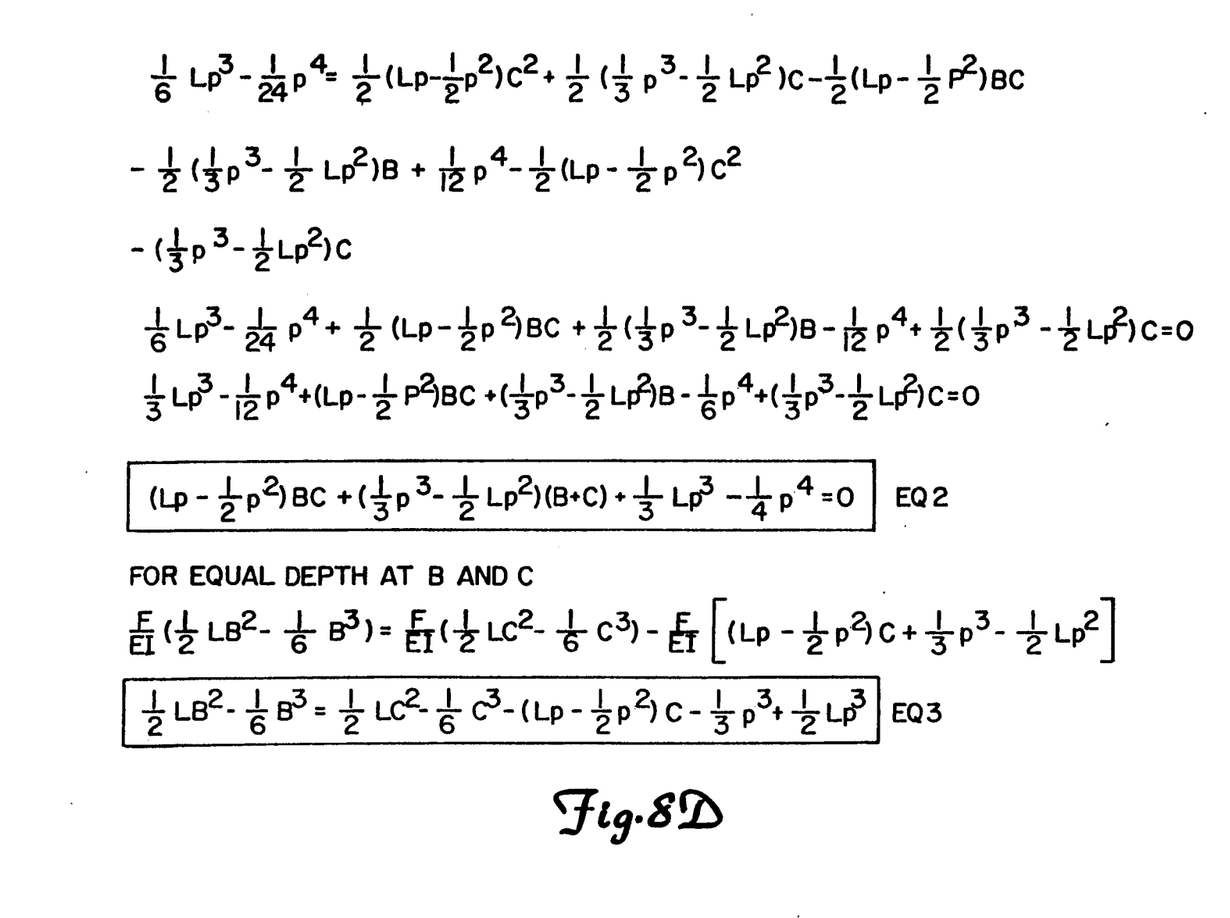

Equation 2 is derived in FIGS. 8B–8D.

Second, the depth of the depressions at points B and C, when resilient section 54 is in the loaded state, must be equal. This results in another relationship between points B and C.

$$\tfrac{1}{2}LB^2 - 1/6B^3 = \tfrac{1}{2}LC^2 - 1/6C^3 - (Lp - \tfrac{1}{2}p^2)C - \tfrac{1}{3}p^3 + \tfrac{1}{4}Lp^2 \qquad \text{Eq. 3}$$

Equation 3 is also derived in FIGS. 8B–8D. The values of B and C that satisfy these two relationships can be found by using known iterative methods.

Figure 9:
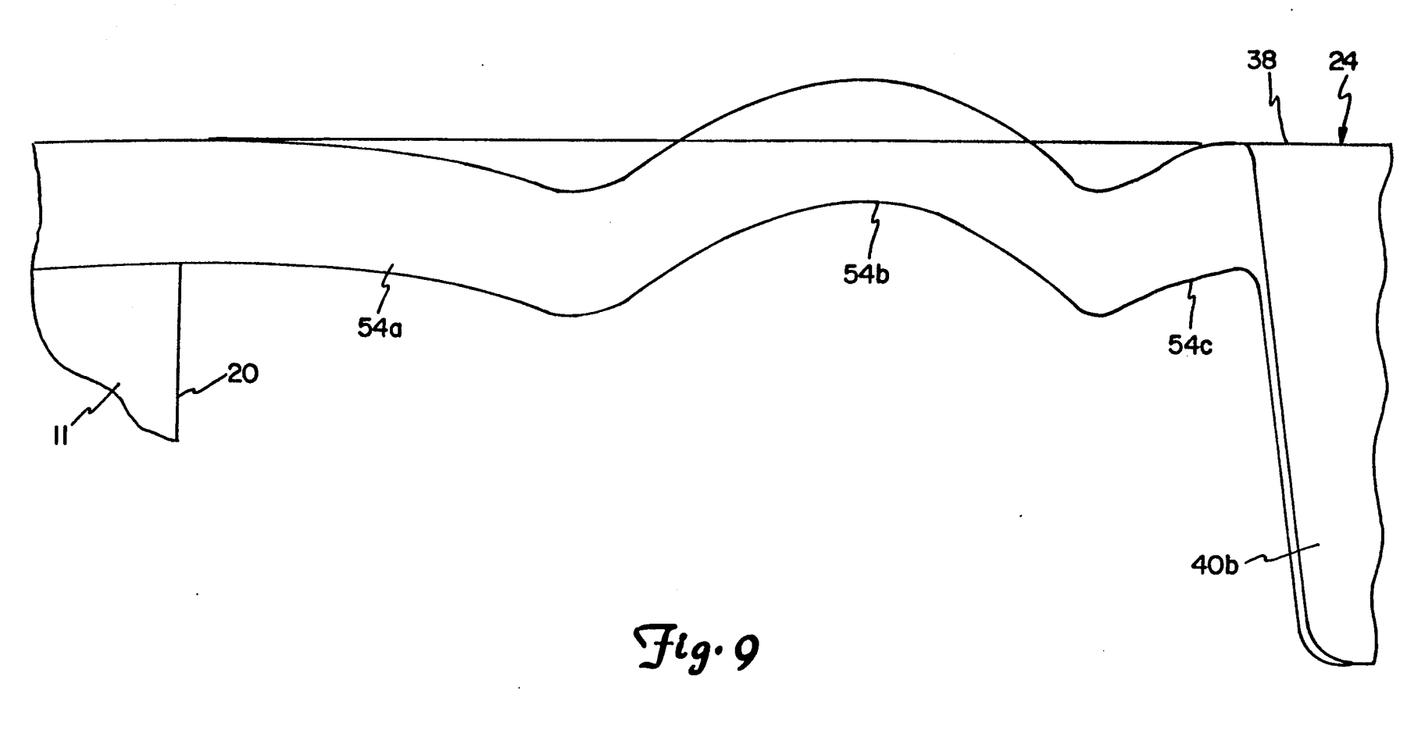
FIG. 9 is an enlarged side view of the bend in the load beam of the present invention in the loaded state.

FIG. 9 graphically shows that resilient section 54 of the present invention is significantly flatter in the loaded state than section 36 of the prior art. Moreover, resilient section 54 is at a height equal to the ideal flat line at the point where resilient section 54 meets tapered section 38. Both of these features increase the in-plane stiffness and rigidity of resilient section 54.

In addition, since there are two preformed bends used to approximate the ideal curve, the angle of each bend is significantly less than the angle of the single bend used in the prior art to approximate the cubic curve. By decreasing the angle of the bends, stiffness of resilient section 54 is increased. Also by reducing the bend angles, curvature in the surface of resilient section 54 is reduced. Consequently, inplane stiffness and rigidity in resilient section 54 is further increased.

Also, the flat state depression at the bend point in the prior art was sensitive to the mandrel diameter due to the large bend angle. By reducing the angle in the bends, the sensitivity of the bend radius to flat-state depression at the bend points is reduced.

Further, since the bend angles at the bend points of section 54 are reduced, small radii mandrels can be used to produce the bends. The small radii produces strains well above the yield point of the material used to form section 54, thus reducing the sensitivity of the bend forming process to the materials yield strength. This improves the controllability of the fabrication process. Moreover, the use of small radii mandrels provides a resilient section with a decrease in unwanted cross-curvature thereby further increasing the in-plane rigidity of the load beam.

Although the present invention has been described with reference to preferred embodiments, workers skilled in the art will recognize that changes may be made in form and detail without departing from the spirit and scope of the invention.

What is claimed is:

1. A load beam for coupling a gimbal to a support arm in a head-gimbal assembly, comprising:
   a resilient section with a first end for attachment to the support arm and a second end, and having a plurality of preformed bends between the first and second ends wherein each preformed bend is perpendicular to a line that extends longitudinally between the first end and the second end and follows a surface of the load beam and wherein each preformed bend bends in approximately a same direction; and
   a substantially rigid section having a first end coupled to the second end of the resilient section and a second end for attachment to the gimbal.

2. The load beam of claim 1 wherein the resilient section and the substantially rigid section are formed integrally with one another.

3. The load beam of claim 1 wherein the plurality of preformed bends further comprises:
   a first preformed bend in the resilient section, the first preformed bend being spaced from the first end of the resilient section; and
   a second preformed bend in the resilient section, the second preformed bend being between the first preformed bend and the substantially rigid section.

4. The load beam of claim 3 wherein the resilient section is a substantially rectangular section.

5. The load beam of claim 3 wherein the first preformed bend is located a first distance (A) from the first end of the resilient section, the second preformed bend is located a second distance (B) from the first end of the resilient section, the resilient section has a length (p), the length of the substantially rigid section plug p equals a length (L), and where $$(Lp - \tfrac{1}{2}p^2)BC + (\tfrac{1}{3}p^3 - \tfrac{1}{2}Lp^2)(B+C) + \tfrac{1}{4}Lp^3 - \tfrac{1}{5}p^4 = 0$$

and $$\tfrac{1}{2}LB^2 - 1/6B^3 = \tfrac{1}{2}LC^2 - 1/6C^3 - (Lp - \tfrac{1}{2}p^2)C - \tfrac{1}{3}p^3 + \tfrac{1}{4}Lp^2$$

6. The load beam of claim 1 wherein the substantially rigid section is a flanged, tapered section.

7. A head-gimbal assembly (HGS) connected to a support arm for movign the HGA about an axis of rotation in a magnetic recording system where information is recorded on and retrieved from a magnetic disk, comprising:
   transducer means for recording and retrieving the information;
   slider means, coupled to the transducer means, for providing a lifting force to allow the transducer means to fly over the disk;
   gimbal means, coupled to the slider means for providing a resilient connection to the slider means;
   load beam means, coupled to the support arm and the gimbal means, for supplying a load force to counteract the lifting force provided by the slider means, the load beam means having a plurality of preformed bends generally perpendicular to a line extending between the gimbal means and the support arm wherein at least two of the preformed bends are bent in approximately a same direction.

8. The HGA of claim 7 wherein the load beam means further comprises:
   a resilient section with a first end coupled to the support arm and a second end; and
   a substantially rigid section coupled to the second end of the resilient section and coupled to the gimbal means.

9. The HGA of claim 8 wherein the plurality of preformed bends further comprises:
   a first preformed bend in the resilient section, the first preformed bend being spaced from the first end of the resilient section; and a second preformed bend in the resilient section, the second preformed bend being between the first preformed bend and the substantially rigid section.

10. The HGA of claim 9 wherein the resilient section is a substantially rectangular section.

11. The HGA of claim 9 wherein the first preformed bend is located a first distance (A) from the first end of the resilient section, the second preformed bend is located a second distance (B) from the first end of the resilient section, the resilient section has a length (p), the length of the substantially rigid section plus p equals a length (L), and where $$(Lp - \tfrac{1}{2}p^2)BC + (\tfrac{1}{3}p^3 - \tfrac{1}{2}Lp^2)(B+C) + \tfrac{1}{3}Lp^3 - \tfrac{1}{4}p^4 = 0$$

and $$\tfrac{1}{2}LB^2 - 1/6B^3 = \tfrac{1}{2}LC^2 - 1/6C^3 - (Lp - \tfrac{1}{2}p^2)C - \tfrac{1}{3}p^3 + \tfrac{1}{2}Lp^2$$

12. The HGA of claim 9 wherein the substantially rigid section is a flanged, tapered section.

13. A load beam for coupling a gimbal to a support arm in a head-gimbal assembly, comprising:
 a first resilient section provided with a first end for attachment to the support arm;
 a second resilient section;
 a first preformed bend coupling the first resilient section to the second resilient section;
 a third resilient section;
 a second preformed bend coupling the second resilient section to the third resilient section wherein each preformed bend is perpendicular to a line that extends longitudinally between the first resilient section and the third resilient section and follows surfaces of the first resilient section, the second resilient section and the third resilient section and wherein each preformed bend bends in approximately a same direction; and
 a substantially rigid section with a first end coupled to the third resilient section and a second end for attachment to the gimbal.

14. The load beam of claim 13 wherein the first and second preformed bends are arranged so the load beam has a shape which approximates a cubic curve.

15. The load beam of claim 13 wherein the first, second and third resilient sections are substantially flat, rectangular sections.

16. The load beam of claim 15 wherien the first preformed bend if located a first distance (A) from the first end of the first resilient section, the second preformed bend is located a second distance (B) from the first end of the first resilient section, the first, second and third resilient sections have a total length (p), the length of the substantially rigid section plus p equals a length (L), and where $$(Lp - \tfrac{1}{2}p^2)BC + (\tfrac{1}{3}p^3 - \tfrac{1}{2}Lp^2)(B+C) + \tfrac{1}{3}Lp^3 - \tfrac{1}{4}p^4 = 0$$

and $$\tfrac{1}{2}LB^2 - 1/6B^3 = \tfrac{1}{2}LC^2 - 1/6C^3 - (Lp - \tfrac{1}{2}p^2)C - \tfrac{1}{3}p^3 + \tfrac{1}{2}Lp^2$$

* * * * *

UNITED STATES PATENT AND TRADEMARK OFFICE
CERTIFICATE OF CORRECTION

PATENT NO. : 5,065,268

DATED : November 12, 1991

INVENTOR(S) : Tracy M. Hagen

It is certified that error appears in the above-identified patent and that said Letters Patent is hereby corrected as shown below:

Col. 6, line 24, delete "plug" and insert --plus--.

Col. 6, line 37, delete "movign" and insert --moving--.

Col. 8, line 17, delete "if" and insert --is--.

Signed and Sealed this

Ninth Day of March, 1993

Attest:

STEPHEN G. KUNIN

*Attesting Officer*  *Acting Commissioner of Patents and Trademarks*